United States Patent [19]
Yamazaki et al.

[11] Patent Number: 5,566,009
[45] Date of Patent: Oct. 15, 1996

[54] POLYMER-DISPERSED ANTIFERROELECTRIC LIQUID CRYSTAL DEVICE

[75] Inventors: Shunpei Yamazaki, Tokyo; Takeshi Nishi, Kanagawa; Toshimitsu Konuma, Kanagawa; Michio Shimizu, Kanagawa; Kouji Moriya, Kanagawa, all of Japan

[73] Assignee: Semiconductor Energy Laboratory Co., Ltd., Kanagawa-ken, Japan

[21] Appl. No.: 447,549

[22] Filed: May 23, 1995

Related U.S. Application Data

[63] Continuation of Ser. No. 24,946, Mar. 2, 1993, abandoned.

[30] Foreign Application Priority Data

| Mar. 4, 1992 | [JP] | Japan | 4-082702 |
| Mar. 17, 1992 | [JP] | Japan | 4-091802 |
| Jul. 10, 1992 | [JP] | Japan | 4-207439 |

[51] Int. Cl.⁶ .......................... G02F 1/137; G02F 1/136
[52] U.S. Cl. .................. 359/51; 359/59; 359/100
[58] Field of Search .................. 359/51, 56, 52, 359/57, 59, 100, 104; 345/90, 92, 93

[56] References Cited

U.S. PATENT DOCUMENTS

| 4,818,070 | 4/1989 | Gunjima et al. | 359/103 |
| 5,078,477 | 1/1992 | Jono et al. | 359/103 |
| 5,087,387 | 2/1992 | Mullen et al. | 359/103 |
| 5,200,846 | 4/1993 | Hiroki et al. | 359/57 |
| 5,223,959 | 6/1993 | Wu et al. | 359/51 |
| 5,253,090 | 10/1993 | Yamazaki et al. | 359/81 |
| 5,268,783 | 12/1993 | Yoshinaga et al. | 359/103 |
| 5,389,287 | 2/1995 | Nishiyama et al. | 359/52 |

OTHER PUBLICATIONS

Molsen et al "Antiferroelectric Switching. . . Liquid Crystals" JPN. J. Appl. Phys. vol. 31–Part 2, No. 8A–Aug. 1992–pp. 1083–1085.

*Primary Examiner*—William L. Sikes
*Assistant Examiner*—Tai V. Duong
*Attorney, Agent, or Firm*—Sixbey, Friedman, Leedom & Ferguson, PC; Gerald J. Ferguson, Jr.; Jeffrey L. Costellia

[57] ABSTRACT

A liquid crystal electro-optical device comprising a pair of substrates at least one of them is light-transmitting, electrodes being provided on said substrates, and an electro-optical modulating layer being supported by said pair of substrates, provided that said electro-optical modulating layer comprises an anti-ferroelectric liquid crystal material or a smectic liquid crystal material which exhibits anti-ferroelectricity, and a transparent material.

16 Claims, 12 Drawing Sheets

POLYMER-DISPERSED ANTIFERROELECTRIC LIQUID CRYSTAL DEVICE

This application is a continuation of U.S. patent application Ser. No. 08/024,946, filed Mar. 2, 1993, now abandoned.

BACKGROUND OF THE INVENTION

1. Industrial Field of Application

The present invention relates to a polymer dispersed liquid crystal electro-optical device comprising a liquid crystal/resin composite composed of a high molecular resin having dispersed therein a liquid crystal material. More particularly, it relates to a liquid crystal electro-optical device having a high scattering efficiency.

2. Prior Art

Conventional liquid crystal electro-optical devices include the well known and practically used devices operating in a TN (twisted nematic) or an STN (super twisted nematic) mode. These liquid crystal electro-optical devices are based on nematic liquid crystal and the like. Furthermore, devices using ferroelectric liquid crystals have recently come to our knowledge. Those known liquid crystal electro-optical devices basically comprise a first and a second substrate each having established thereon an electrode and a lead, and a liquid crystal composition being incorporated therebetween. By taking this assembly, the state of the liquid crystal molecules can be varied by applying an electric field to the liquid crystal composition, because the liquid crystal material itself has an anisotropy in dielectric constant, or, in the case of a ferroelectric liquid crystal, it exhibits spontaneous polarization. The electro-optical effect which results therefrom is made use of in the aforementioned liquid crystal electro-optical devices.

In a liquid crystal electro-optical device operating in a TN or STN mode, an alignment treatment, i.e., rubbing, is applied to align the liquid crystal molecules along the rubbing direction at each of the planes in contact with the two substrates by which the liquid crystal layer is sandwiched. Rubbing is applied to the upper and the lower planes as such that their directions may be displaced by 90° or by an angle between 200° and 290° from each other. Accordingly, the intermediate liquid crystal molecules in the liquid crystal layer, i.e., those between the upper and the lower molecules positioned at an angle of from 90° to 290° adjacent to the substrates arrange themselves into a spiral to achieve a configuration of lowest energy. In the case of an STN type liquid crystal device, a chiral substance is optionally added to the liquid crystal material if necessary.

The aforementioned devices, however, require polarizer sheets to be incorporated. Moreover, the liquid crystal molecules need to be regularly arranged ill the liquid crystal electro-optical device to achieve a predetermined alignment. The alignment treatment as referred herein comprises rubbing an alignment film (ordinarily an organic film) with a cotton or a velvet cloth along one direction. If not for this treatment, the liquid crystal molecules are unable to attain a predetermined alignment, and hence, no electro-optical effect can be expected therefrom. Accordingly, conventional liquid crystal electro-optical devices above unexceptionably comprise a pair of substrates which make a container to hold therein a liquid crystal material. Then, the optical effect which results from the oriented liquid crystal having charged into the container can be utilized.

There is also known another type of liquid crystal, a polymer dispersed liquid crystal (referred to sometimes hereinafter as PDLC), which can be used without incorporating any polarizer sheets and applying an alignment treatment and the like. In FIG. 7 is shown schematically a PDLC. A PDLC electro-optical device comprises a solid polymer 4 having dispersed therein a granular or sponge-like liquid crystal material 3 between a pair of light-transmitting substrates 1 to give a light-control layer. A liquid crystal device of this type can be fabricated by dispersing microcapsules of a liquid crystal material in a polymer, and then forming a thin film thereof on a substrate or a film. The liquid crystal material can be encapsulated using, for example, gum arabic, poly(vinyl alcohol), and gelatin.

In the case of liquid crystal molecules being encapsulated in poly(vinyl alcohol), for example, if they show a positive dielectric anisotropy in the thin film, an electric field may be applied in such a manner that their major axes may be arranged in parallel with the electric field. Accordingly, a transparent state can be realized if the refractive index of the encapsulated liquid crystal is equal to that of the polymer. When no electric field is applied, the liquid crystal microcapsules take a random orientation and the incident light is scattered because the refractive index of the liquid crystal greatly differs from that of the polymer. Thus, an opaque or a milky white state is realized. In FIG. 8 is shown the change of transmittance in relation with the applied voltage in the liquid crystal electro-optical device above. The transmittance changes with increasing and decreasing voltage as indicated with arrows in the figure. If the liquid crystal microcapsules have a negative dielectric anisotropy and if the average refractive index of the liquid crystal is equal to that of poly(vinyl alcohol), a transparent state can be realized by applying no electric field.

The term "average refractive index" as referred herein is defined as follows. When no electric field is applied to a liquid crystal material on a non-treated substrate, the refractive indices thereof are found to be distributed as shown in FIG. 10. In the figure, $n_o$ and $n_e$ represent the refractive index for an ordinary light and an extraordinary light, respectively. The "average refractive index" is then defined as the index $n_{ave}$ at the maximum distribution intensity in the curve as shown in FIG. 10.

In the presence of an electric field, on the other hand, a milky white or an opaque state results, because the liquid crystal molecules are arranged as such that the major axes thereof make a right angle with respect to the direction of the electric field to thereby develop a difference in refractive index. A similar result is obtained if the liquid crystal molecules themselves exhibit spontaneous polarization along a direction vertical to the major axes of the liquid crystal molecules. In such a case, the transmittance changes with increasing or decreasing voltage as shown in FIG. 9. In this manner, a PDLC electro-optical device provides various types of information by making the best of the difference between the transparent and the opaque state.

Polymer dispersed liquid crystals include not only those of the encapsulated type, but also those comprising liquid crystal materials being dispersed in an epoxy resin, or those utilizing phase separation between a liquid crystal and a resin which results by irradiating a light for curing a photocurable resin being mixed with a liquid crystal, or those obtained by impregnating a three-dimension polymer network with a liquid crystal. All those enumerated above are referred to as "polymer dispersed liquid crystals" in the present invention.

Because the electro-optical devices using PDLCs are free of polarizer sheets, they yield a far higher light transmittance as compared with any of the conventional electro-optical devices operating on TN mode, STN mode, etc. More specifically, because the light transmittance per polarizer sheet is as low as about 50%, the light transmittance of an active matrix display using a combination of polarizer sheets as a result falls to a mere 1%. In an STN type device, the transmittance results as low as 20%. Accordingly, an additional backlighting is requisite to compensate for the optical loss to lighten those dark displays. In the case of a PDLC electro-optical device, by contrast, 50% or more of light is transmitted. This is clearly an advantage of a device using no polarizer sheets.

Because a PDLC takes two states, i.e., a transparent state and an opaque state, and transmits more light when used in a liquid crystal electro-optical device, the R & D efforts are more paid for developing devices of a light transmitting type. More specifically, particular notice is taken to a light-transmitting liquid crystal electro-optical device of a projection type.

A projection type liquid crystal electro-optical device comprises placing the liquid crystal electro-optical device panel on a light path of a light beam being generated from a light source, and then projecting the light against a flat panel through a slit being provided at a predetermined angle. If the liquid crystal molecules in the liquid crystal panel have a positive dielectric anisotropy, they take a random orientation to realize an opaque (milky white) state in the low electric field region; i.e., at any voltage below a threshold voltage at which the liquid crystal molecules do not respond to the applied voltage. The light incident to a panel at such a state is scattered to widen the light path. The light having scattered then proceeds to the slit, but most of them are cut off to yield a dark state on the flat panel.

On the other hand, when the liquid crystal molecules respond to the applied electric field and when they are thereby arranged in parallel with the direction of the electric field, a light incident thereto passes straight forward to yield a bright state at a high contrast on the flat panel. When the liquid crystal molecules have a negative dielectric anisotropy, or when they have spontaneous polarization along a direction vertical to the major axes of the molecules, and if the average refractive index of the liquid crystal molecules coincide with that of the polymer resin matrix, the liquid crystal electro-optical device panel turns transparent when no electric field is applied; it reversely turns opaque to yield a dark state by scattering the light when an electric field is applied.

As described in the foregoing, the switching of states of a PDLC occurs, in principle, by the scattering of light. That is, in passing through the light control layer comprising the resin and the liquid crystal droplets which differ from each other in terms of refractive index, the light incident on the transparent substrate side greatly changes its course each time it comes to the boundary between the resin and the liquid crystal. Accordingly, the incident light reaches the substrate on the other side in a completely scattered state. To increase the scattering efficiency of the light control layer, it is preferred that the liquid crystal droplets are more frequently brought into contact with the resin along the thickness direction of the light control layer. The more the boundary between a resin and a liquid crystal droplet is provided for a light, the more scattered the light becomes. Accordingly, the scattering efficiency can be increased by providing a thicker control layer. However, a thicker control layer adversely increases the spacing between the substrates, that is, the distance between the electrodes. A longer distance between the electrodes require a larger driving voltage for switching the light control layer. This makes it impossible to drive the liquid crystal cell with an ordinary IC (integrated circuit), particularly with a TFT (thin film transistor).

A practically feasible liquid crystal electro-optical device should, in general, 1) be driven at a low voltage;
2) have rapid response; and
3) be driven at a speed of 0.1 msec (100 μsec) or less even in a cell having a thickness in the range of from 2.5 to 10 μm.

Most of the conventional PDLC electro-optical devices are based on a nematic liquid crystal material, and are yet to satisfy the required quick response. No liquid crystal electro-optical device which satisfy all of the requirements enumerated above and still capable of providing a rapid optical response to dynamic displays without using any polarizer sheets is proposed to present. However, a PDLC electro-optical device using a ferroelectric liquid crystal material is known as a device which satisfy a part of the requirements above. This type of liquid crystal electro-optical device, however, because of the ferroelectric nature of the liquid crystal, exhibits a piezoelectric effect while it is driven. More specifically, the liquid crystal being incorporated between the electrodes undergoes shrinking by the electric field being applied for driving the liquid crystal, and such a change in volume initiates vibration of the substrates as a source of noise. Furthermore, such a vibration of the substrates my cause damage to the liquid crystal electro-optical device due to the peeling off which occurs on the pair of substrates which are adhered to make a cell.

SUMMARY OF THE INVENTION

The present invention has been accomplished with an aim to provide a liquid crystal electro-optical device free of the aforementioned problems. Accordingly, the present invention provides an electro-optical device comprising a pair of substrates at least one of which is transparent; an electro-optical modulating layer provided between said substrates and comprising an antiferroelectric liquid crystal and a transparent material; and means for applying an electric field to said antiferroelectric liquid crystal. Said means comprises an active matrix circuit. The liquid crystal electro-optical device according to the present invention is therefore improved in response speed and freed from the problems attributed to change in volume of the liquid crystal material.

DETAILED DESCRIPTION OF THE INVENTION

The liquid crystal droplets to be dispersed in the light control layer according to the present invention can be prepared by any of the three representative fabrication processes as follows.

(1) A 4:6 to 8:2 mixture of a liquid crystal material and an ultraviolet (UV) curable resin is injected between a pair of substrates, and a UV light is irradiated thereto from the surface of the substrate to cure the resin. Preferably, on irradiating UV light to the mixture, the sample is previously heated to a temperature about 5° to 40° C. higher than the transition temperature at which the mixture of the liquid crystal and the resin undergoes transition from an isotropic phase to a liquid crystal phase.

(2) A solution having previously prepared by dissolving a liquid crystal and a resin in a solvent is applied to the surface of a substrate by a spinner process or by casting, and the solvent is gradually evaporated. The resin for use in this process include poly(ethylene terephthalate), polyfumarates, polycarbazoles, and PMMA [poly(methyl methacrylate)].

(3) A liquid crystal is encapsulated with poly(vinyl alcohol) to obtain microcapsules of the liquid crystal.

Figure 2A:
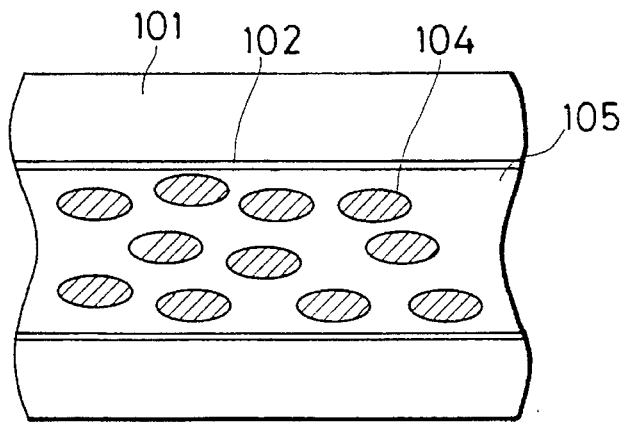
FIGS. 2(A)–(C) are a schematically drawn cross sectional views of liquid crystal electro-optical devices according to embodiments of the present invention.
Figure 2B:
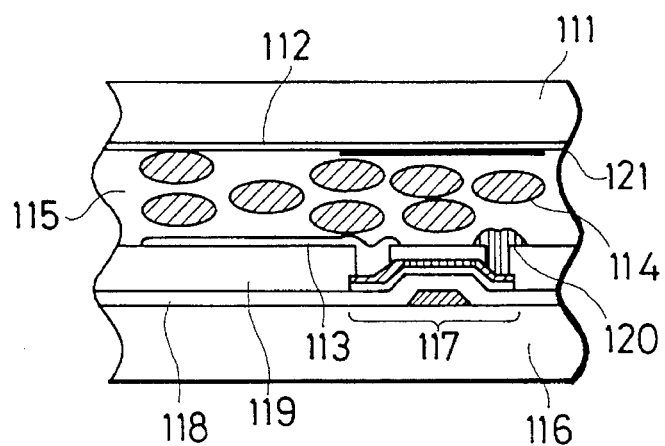
Figure 2C:
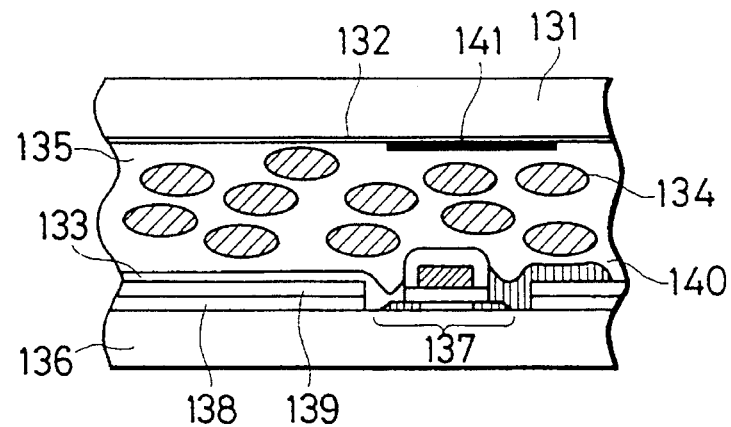
Figure 7:
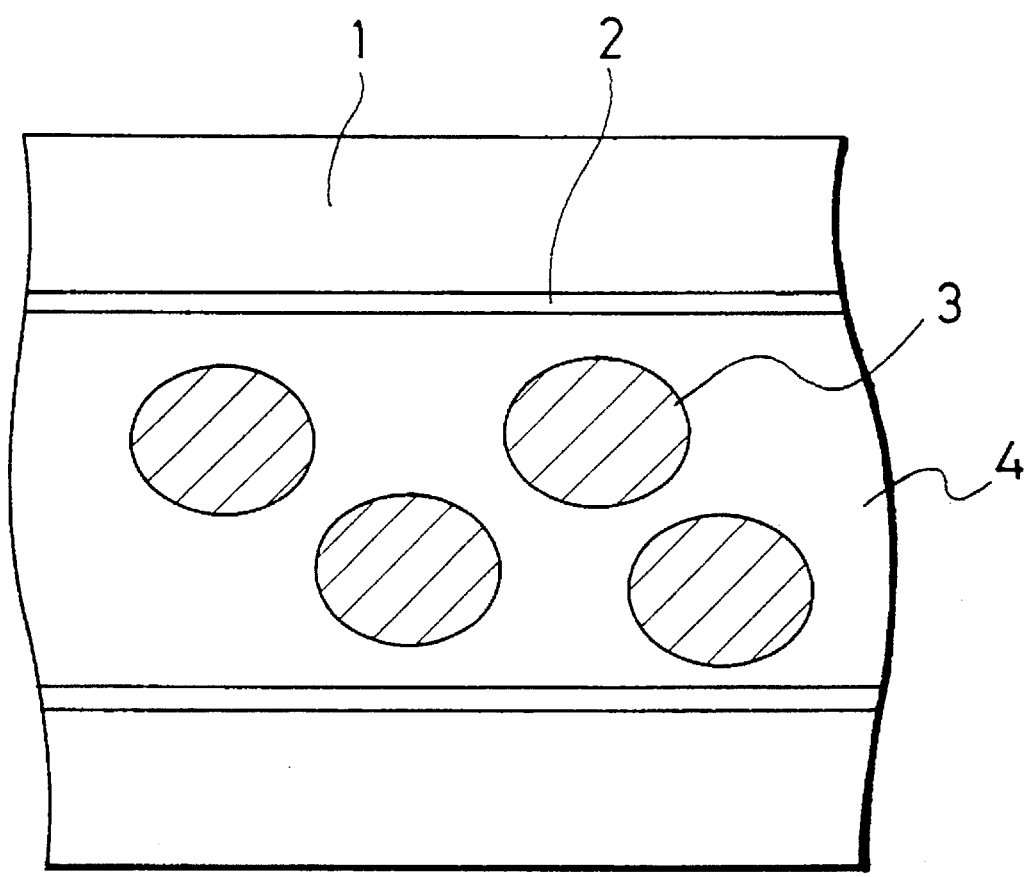
FIG. 7 is a schematically drawn cross sectional view of a polymer dispersed liquid crystal electro-optical device.

As shown in FIG. 2(A), spherical liquid crystal droplets 104 can be obtained by any of the processes above. In FIG. 7, those spherical droplets 3 can also be seen. In FIG. 2(A) and FIG. 7 are shown basic liquid crystal cells using a liquid crystal material according to the present invention. Needless to say, liquid crystal displays having a known active matrix structure can be fabricated making use of the present invention as well. In FIGS. 2(B) and 2(C) are shown active matrices using a reverse stagger type TFT and a coplanar TFT, respectively.

The present invention is illustrated in greater detail referring to non-limiting examples below. It should be understood, however, that the present invention is not to be construed as being limited thereto.

EXAMPLE 1

As shown in FIG. 2(A), a polymer dispersed liquid crystal was fabricated first by a known process. The present Example refers to a polymer dispersed liquid crystal using a UV curable resin. A transparent conductive coating, i.e., an ITO (Indium-Tin-Oxide) film 102, was deposited on a light-transmitting substrate 101 by a known vapor deposition or sputtering process to a thickness of from 500 to 2,000Å. The ITO film thus obtained had a sheet resistivity of from 20 to 200 $\Omega/cm^2$. The film thus obtained was patterned by an ordinary photolithographic process. The resulting first and second substrates were adhered together under pressure, while maintaining a spacing of from 5 to 100 µm, preferably from 7 to 30 µm, by incorporating an inorganic spacer between the substrates. In this manner, the cell spacing can be maintained constant at about the diameter of the spacer. As the liquid crystal material, an ester based anti-ferroelectric liquid crystal having a refractive index of 1.6 and a Δn of 0.2 was mixed with a photocurable resin having a refractive index of 1.573 and comprising a mixed system of an urethane oligomer and an acrylic monomer.

The aforementioned mixed material was stirred and subjected to ultrasonic vibration to obtain a homogeneous mixture. The mixing was effected by heating the mixture while applying stirring and ultrasonic vibration to obtain a homogeneous mixture as a liquid of an isotropic phase, and the resulting mixture was cooled to obtain a liquid crystal phase. This method was found very effective for obtaining the desired liquid crystal mixed system.

The resulting liquid crystal mixed system was injected between the first and the second substrates above at a temperature higher than the $S_A$-I phase transition temperature of the liquid crystal mixed system, and an UV light was irradiated thereto at an intensity of from about 10 to 100 mW/cm² for a duration of from about 30 to 300 seconds to cure the resin while allowing the mixed system to undergo phase separation into a liquid crystal and a resin. As a result, liquid crystal droplets 104 surrounded by a resin (transparent material) 105 were formed.

The liquid crystal device thus obtained scatters light when no electric field is applied between the electrodes having established on the upper and the lower substrates, because the liquid crystal molecules are arranged in a random orientation. When a voltage is applied to the electrodes, on the other hand, the liquid crystal molecules align along a particular direction according to the direction of the electric field. At this state, light can be transmitted by the electro-optical effect which is generated by the anisotropy in refractive index of the liquid crystal material. A maximum light transmission can be achieved if the refractive index of the liquid crystal material along the direction of light transmittance is equal to that of the light-transmitting substance on applying an electric field.

The liquid crystal material used in the present Example undergoes a phase transition sequence of Iso-SmA-SmC$_A^*$-Cry. More specifically, it undergoes phase transition from Iso to SmA at 92° C., from SmA to SmC$_A^*$ at 60° C., and from SmC$_A^*$ to Cry at −20° C. It has a positive dielectric anisotropy with a birefringence Δn of about 0.2, and a spontaneous polarization of 12 nC/cm².

The liquid crystal electro-optical device thus obtained yielded a switching rate at 25° C. of 40 µsec, and the corresponding response speed was high. It required a relative high threshold voltage of from 5 to 9 V/µm for driving the liquid crystal. However, because the liquid crystal electro-optical device of the present invention has a high light scattering efficiency, the device itself can be made thinner by reducing the spacing between the substrates and hence the driving voltage can be reduced to a level well comparable to a generally employed voltage.

Because an anti-ferroelectric liquid crystal material is used in the device according to the present invention, the shrinkage of the liquid crystal material due to volume change thereof on applying an electric field for driving the device can be considerably reduced as compared with that of a ferroelectric liquid crystal material. Thus, no vibration occurs on the substrate of the liquid crystal electro-optical device according to the present invention.

Furthermore, a higher contrast can be achieved with a liquid crystal electro-optical device comprising an antiferroelectric smectic liquid crystal according to the present invention. This is ascribed to the fact that the smectic layer structure, i.e., the structure which the anti-ferroelectric liquid crystal material takes in the dispersed droplets, can be deformed by the electric field being applied thereto. Thus, the refractive index of the liquid crystal material can be greatly differed from that of the transparent material comprising a resin. This is in clear contrast with the case using a ferroelectric liquid crystal material, because the smectic layer structure of the ferroelectric liquid crystal material as dispersed droplets cannot be deformed by an external electric field.

EXAMPLE 2

An active matrix addressed liquid crystal cell using the liquid crystal material described in Example 1 was fabricated. Referring to FIG. 2(B), the fabrication process is described below. An ITO coating 112 was deposited on a first substrate 111 by a known sputtering process to a thickness of from 5 to 200 nm. A soda-lime glass substrate was used as the first substrate 111. If a TFT is to be formed directly on the first substrate, the use of an alkali-free glass substrate is preferred from the viewpoint of preventing the TFT from being contaminated by an alkali.

A black coating was formed in stripes to give black stripes 121 to avoid exposure of amorphous silicon of the TFT to external light. Thus was the first substrate completed.

An amorphous silicon TFT 117 having a gate insulator 118 based on silicon nitride was established by a known process on a second substrate made of an alkali-free glass such as a Corning 7059. A polyimide film 119 which serves as an interlayer insulator and also as a smoothing layer was formed at a thickness of from 200 to 1000 nm. Then, data connections 110 for an active matrix were formed using Cr, and a pixel electrode 113 using ITO was established further thereon to complete the second substrate.

The first and the second substrates thus obtained were adhered together in the same manner as in Example 1 by incorporating spacers (not shown in the Figure) to maintain a distance between the substrates in a range of from 5 to 100 μm, preferably, from 7 to 30 μm. Then, the same liquid crystal material as that used in Example 1 was injected into the resulting cell structure, and UV light at an intensity of from about 10 to 100 mW/cm² was irradiated to the liquid crystal material from the first substrate side to cure the resin. Thus was obtained liquid crystal droplets 114 being surrounded by the resin 115. At this point, the liquid crystal material portion under the black stripes 121 remains uncured, because this portion is not necessary for the display.

Figure 4C:
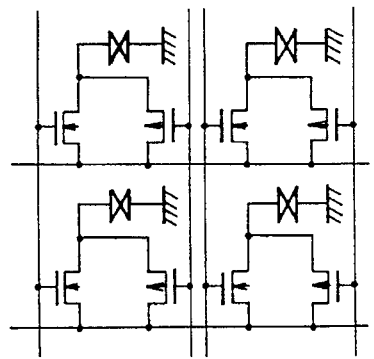
FIGS. 4(A)–4(F) show a circuit diagrams for active matrix addressing.
Figure 4B:
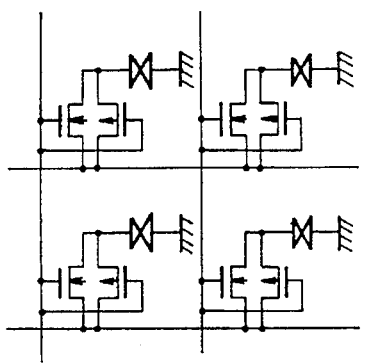
Figure 4A:
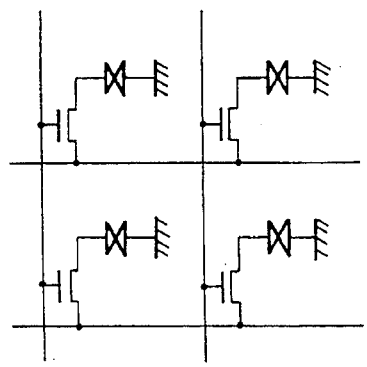
Figure 6A:
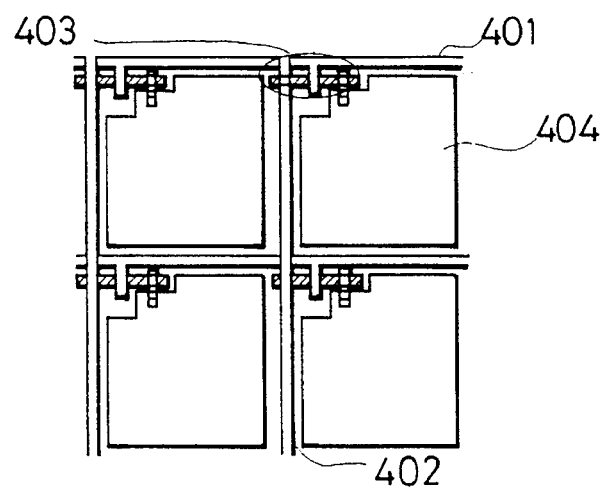
FIGS. 6(A)–6(C) show structures for active matrix addressing.
Figure 6B:
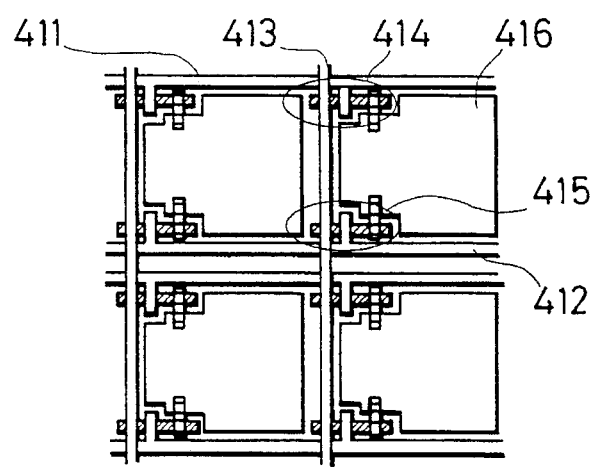

The active matrix addressed liquid crystal panel thus obtained comprises a circuit structure as shown in FIG. 4(A). In FIG. 4(A) is given a part, i.e., a 2×2 matrix of the entire structure. The planar view of the second substrate of the present Example is given in FIG. 6(A). Referring to FIG. 6(A), a pixel electrode 404 and a TFT 403 are provided in a region defined by a gate line (scan line) 401 and a data line 402. Then, connections for pixel matrix were provided to the liquid crystal panel by a known TAB (tape automated bonding) process, and a voltage at a proper level was applied to each of the connections to confirm the display of images.

EXAMPLE 3

An active matrix addressed liquid crystal cell using the liquid crystal material described in Example 1 was fabricated. Referring to FIG. 2(C), the fabrication process is described below. An ITO coating 132 was deposited on a first substrate 131 by a known sputtering process to a thickness of from 5 to 200 nm. A soda-lime glass substrate was used as the first substrate 131. If a TFT is to be formed directly on the first substrate, the use of an alkali-free glass substrate is preferred from the viewpoint of preventing the TFT from being contaminated by an alkali. Black stripes 141 were also formed in the same manner as in Example 2. Thus was the first substrate completed.

A polycrystalline silicon (polysilicon) TFT 137 having a gate insulator 138 based on silicon oxide was established by a known process on a second substrate made of a heat-resistant alkali-free glass such as a Corning 1733 and quartz glass. An interlayer insulator 139 was formed on the TFT element 137 at a thickness of from 200 to 1000 nm. Then, data connections 140 for the active matrix were formed using Cr, and a pixel electrode 133 using ITO was established further thereon to complete the second substrate.

The first and the second substrates thus obtained were adhered together in the same manner as in Example 1 by incorporating therebetween spacers (not shown in the Figure) to maintain a distance between the substrates in a range of from 5 to 100 μm, preferably, from 7 to 30 μm. Then, the same liquid crystal material as that used in Example 1 was injected into the resulting cell structure, and UV light at an intensity of from about 10 to 100 mW/cm² was irradiated to the liquid crystal material from the first substrate side to cure the resin. Thus was obtained liquid crystal droplets 134 being surrounded by the resin 135. At this point, the liquid crystal material portion under the black stripes 141 remains uncured, because this portion is not necessary for the display.

The active matrix addressed liquid crystal panel thus obtained comprises a circuit structure as shown in FIG. 4(A). In FIG. 4(A) is given a part, i.e., a 2×2 matrix of the entire structure. A driver circuit was formed together on the same substrate of the liquid crystal panel of the present Example. Accordingly, no external driver circuit was necessary for the present liquid crystal panel. Thus, required signals were externally input to the liquid crystal panel to confirm the display of images.

EXAMPLE 4

An active matrix addressed liquid crystal cell of a CMOS (complementary MOS) transfer gate type using the liquid crystal material described in Example 1 was fabricated. The circuit structure of the matrix fabricated in the present Example is shown in FIG. 4(B). An N-channel TFT (NTFT) and a P-channel TFT (PTFT) were established on a single pixel, so that they may function in a complementary manner. Thus, the active matrix circuit for applying an electric field to the antiferroelectric liquid crystal may comprise at least two transistors having different conductivity types from each other for each pixel of the electro-optical device in accordance with the present invention. Black stripes and an ITO transparent conductive film were formed on the first substrate in the same manner as in Examples 2 and 3.

The process for fabricating the second substrate is described below making special reference to the fabrication of a CMOS TFT (CTFT). The fabrication steps are shown schematically by a cross section view in FIG. 3. The second substrate may be made from a heat resistant alkali-free glass such as Corning 1733 glass and quartz glass, but in this Example, an N/O glass (a product of Nippon Electric Glass Co., Ltd.) was used. The N/O glass has an excellent heat resistance and a thermal expansion coefficient equal to that of quartz, but contains elements unfavorable for a TFT, such as Li, at a considerable amount. Thus, a silicon nitride coating 202 was formed on the second substrate at a thickness of from 20 to 200 nm to prevent the unfavorable alkali elements from influencing the overlying TFT. Furthermore, a 100 to 1,000 nm thick silicon oxide coating 203 was deposited thereon by sputtering to provide a basecoating for the TFT.

Figure 3A:
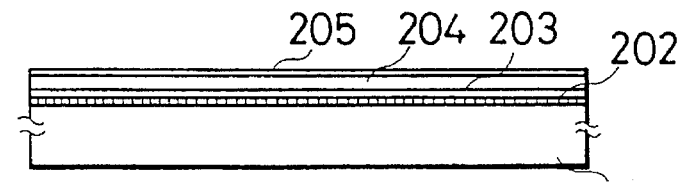
FIGS. 3(A)–3(F) are a schematically drawn cross sectional views of a liquid crystal electro-optical device according to an embodiment of the present invention, in a step of the fabrication process.

Then, a substantially intrinsic semiconductor film, which may be either amorphous or polycrystalline, an amorphous silicon film 204, for example, was formed at a thickness of from 50 to 500 nm on the basecoating obtained above. This was followed by the deposition of a silicon oxide film 205 at a thickness of from 10 to 100 nm by sputtering, for use as a cap. The resulting structure was then annealed at 600° C. for 60 hours in a nitrogen atmosphere to effect recrystallization. Thus was obtained a structure as shown in FIG. 3(A).

The resulting structure was then patterned into islands to establish an NTFT region 207 and a PTFT region 206.

Figure 3B:
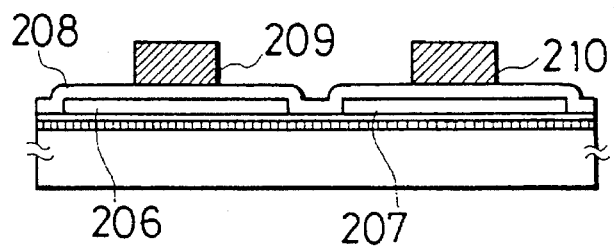

Then, a silicon oxide film was deposited as a gate insulator 208 at a thickness of from 50 to 150 nm thereon by ECR (electron cyclotron resonance) plasma-assisted CVD (chemical vapor deposition) process or by sputtering, and a 500 nm thick aluminum coating was deposited further thereon by sputtering. The aluminum coating was patterned to establish gate electrode portions 209 and 210 for the PTFT and NTFT, respectively. The channel was provided at a length of 8 μm and a width of 8 μm. The resulting structure is illustrated in FIG. 3(B).

Then, electric current was applied to the gate electrode portions, i.e., gate electrodes with connections 209 and 210, to form aluminum oxide coatings 211 and 212 on and to the surroundings (upper and side surfaces) of the portions 209 and 210 by an anodic oxidation process. The anodic oxidation process was conducted under the same conditions as those described in the inventions provided by the present inventors, as are disclosed in Japanese patent application Nos. 4-30220 and 4-38637. Thus was obtained an anodically oxidized film at a thickness of about 350 nm.

Figure 3C:
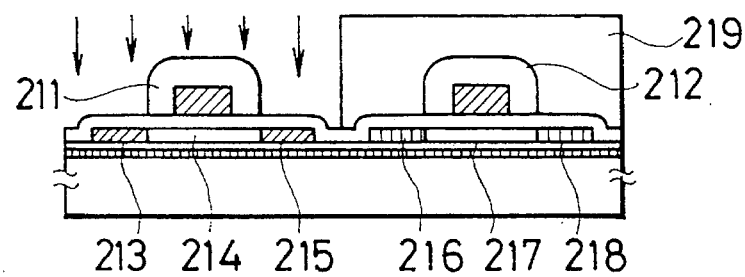

Phosphorus as an N-type impurity was then introduced into the island-like semiconductor portions 206 and 207 by ion implantation, using the gate electrode portions 211 and 212 as the masks according to a self-aligned process. Further then, the NTFT portion only was covered with, for example, a photoresist as a masking material 219 as shown in FIG. 3(C), and boron as a P-type impurity was introduced into the portion 206 in a self-aligned manner. In this manner were obtained the P-type impurity regions 213 and 215, as well as the N-type impurity regions 216 and 218. Channel regions 214 and 217 for PTFT and NTFT, respectively, were also obtained as a consequence.

Figure 3D:
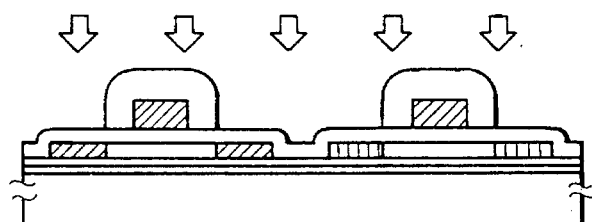
Figure 3E:
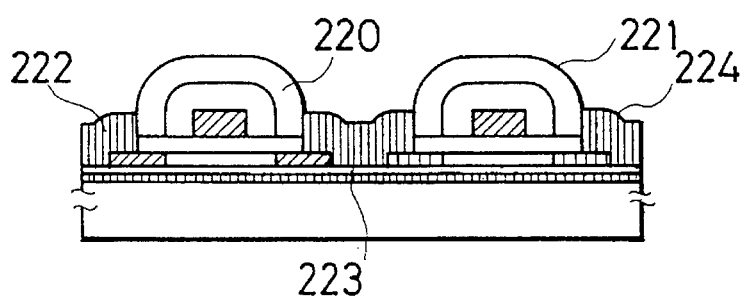
Figure 3F:
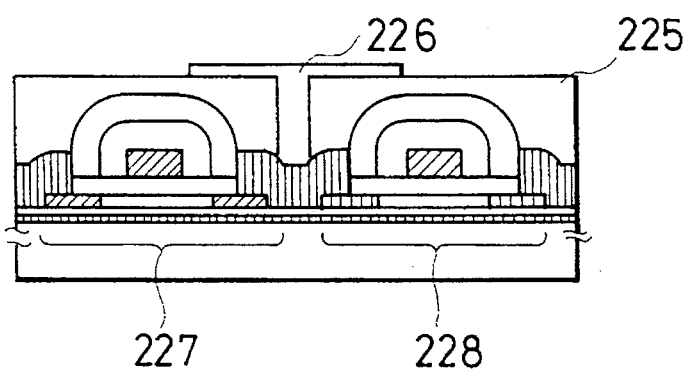

After conducting ion doping, the amorphous regions having resulted by impurity injection were activated by subjecting them to laser annealing as illustrated in FIG. 3(D). The conditions for the laser annealing are the same as those described in the previous inventions of the present authors, as disclosed in Japanese patent application Nos. 4-30220 and 4-38837. Furthermore, after establishing interlayer insulators 220 and 221, contact holes were bore, and a chromium coating was provided thereon by sputtering. The chromium coating thus obtained was patterned to establish connections 222, 223, and 224 to obtain a structure as shown in FIG. 3(E).

Finally, a polyimide coating 225 was provided on the second substrate by a known spin-coating process to smooth the surface. Then, a contact hole was formed thereon to establish a pixel electrode 228 using ITO to complete the second substrate.

The first and the second substrates thus obtained were adhered together in the same manner as in Example 1 by incorporating therebetween spacers to maintain a distance between the substrates in a range of from 5 to 100 μm, preferably, from 7 to 30 μm. Then, the same liquid crystal material as that used in Example 1 was injected into the resulting cell structure, and UV light at an intensity of from about 10 to 100 mW/cm$^2$ was irradiated to the liquid crystal material from the first substrate side to cure the resin. Thus was obtained liquid crystal droplets being surrounded by the resin.

The active matrix addressed liquid crystal panel thus obtained comprises a circuit structure as shown in FIG. 4(B). In FIG. 4(B) is given a part, i.e., a 2×2 matrix of the entire structure. A driver circuit was formed together on the same substrate of the liquid crystal panel of the present Example as in the liquid crystal panel obtained in Example 3. Accordingly, no external driver circuit was necessary for the present liquid crystal panel. Thus, for driving the circuit of the present Example, a method as described in the previous invention of the present inventors, as disclosed in Japanese patent application No. 3-208848, may be employed. The liquid crystal panel thus obtained in the present Example was driven according to substantially the same method disclosed in the aforementioned Japanese patent application No. 3-208848 to confirm the display of images.

EXAMPLE 5

Figure 8:
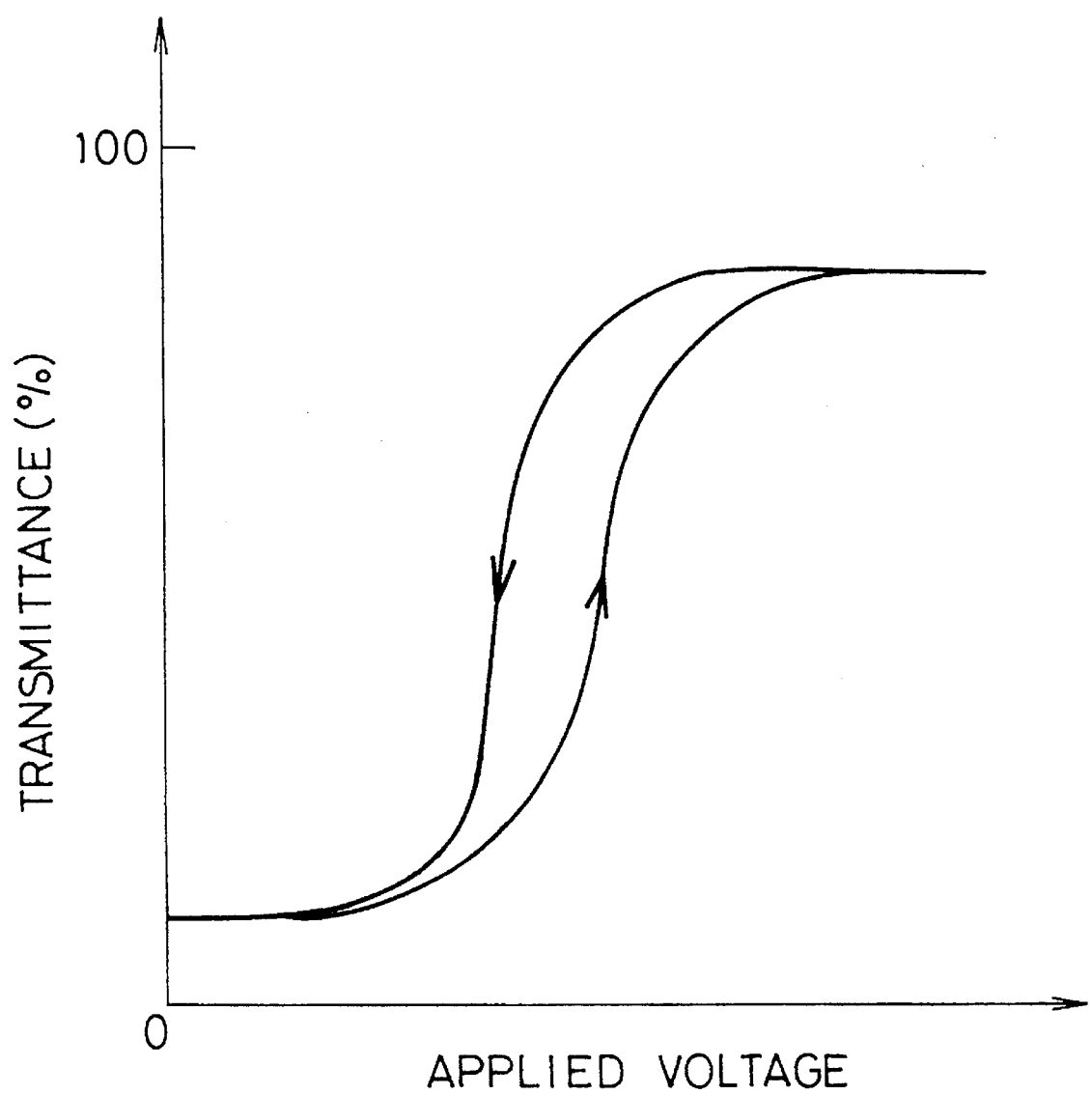
FIG. 8 is a graph showing the change of transmittance with increasing and decreasing voltage of a polymer dispersed liquid crystal electro-optical device in which a liquid crystal material having a positive dielectric anisotropy is used.

An active matrix addressed liquid crystal cell of a CMOS transfer gate type using the liquid crystal material described in Example 1 was fabricated. The circuit structure of the matrix fabricated in the present Example is shown in FIG. 4(C). An N channel TFT (NTFT) and a P channel TFT (PTFT) were established on a single pixel, so that they may function in a complementary manner. In FIG. 8(B) is shown a plan view for the circuit established on the second substrate of the present Example. The circuit comprises a region defined by a first and a second scan line 411 and 412, respectively, and a data line 413, in which a pixel electrode 418, an NTFT 414, and a PTFT 415 are established.

The first and the second substrates were fabricated essentially in the same process as described in Example 4, except for the circuit arrangement. The first and the second substrates thus obtained were adhered together in the same manner as in Example 1. The same liquid crystal material as that used in Example 1 was injected into the resulting cell structure, and UV light at an intensity of from about 10 to 100 mW/cm$^2$ was irradiated to the liquid crystal material from the first substrate side to cure the resin. Thus was obtained liquid crystal droplets being surrounded by the resin.

For driving the circuit of the present Example, a method as disclosed in Japanese patent application Nos. 63-82177 and 63-966361 may be employed. The liquid crystal panel thus obtained in the present Example was driven according to substantially the same method disclosed in the aforementioned Japanese patent application No. 63-82177 to confirm the display of images.

EXAMPLE 6

Figure 4F:
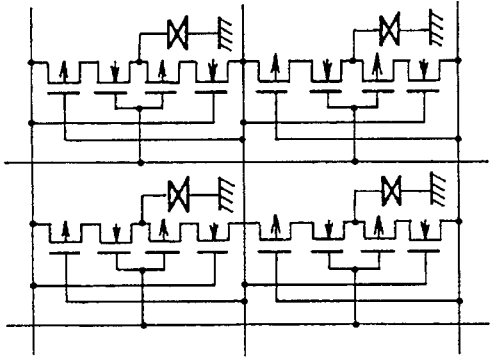
Figure 4E:
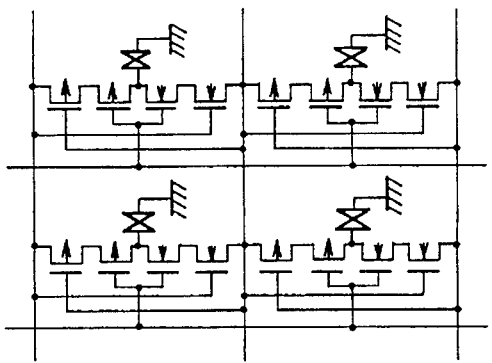
Figure 4D:
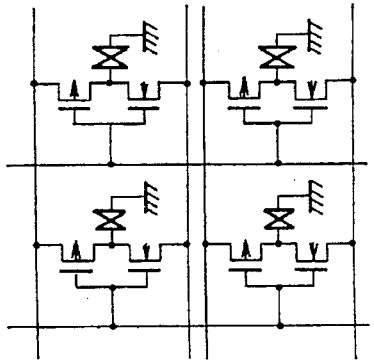
Figure 6C:
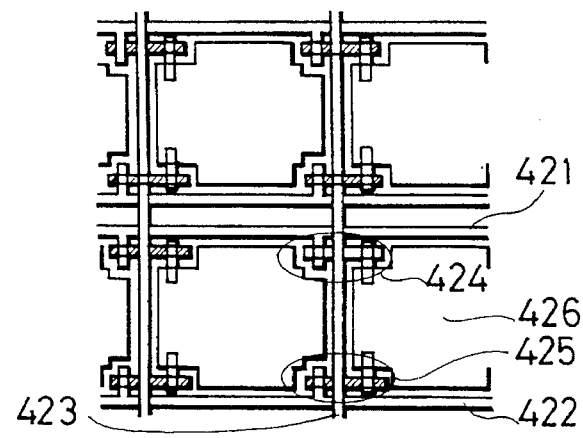

An active matrix addressed liquid crystal cell of a CMOS inverter type using the liquid crystal material described in Example 1 was fabricated. The circuit structure of the matrix fabricated in the present Example is shown in FIG. 4(D). As shown in the figure, it was designed as such that an N-channel TFT (NTFT) and a P-channel TFT (PTFT) may be established on a single pixel, so that they may function in a complementary manner. In FIG. 6(C) is shown a plan view for the circuit established on the second substrate of the present Example. The circuit comprises a region defined by a first and a second scan line 421 and 422, respectively, and a data line 423, in which a pixel electrode 426, an NTFT 424, and a PTFT 425 are established.

The first and the second substrates were fabricated essentially in the same process as described in Example 4, except for the circuit arrangement. The first and the second substrates thus obtained were adhered together in the same manner as in Example 1. The same liquid crystal material as that used in Example 1 was injected into the resulting cell structure, and UV light at an intensity of from about 10 to 100 mW/cm$^2$ was irradiated to the liquid crystal material from the first substrate side to cure the resin. Thus was obtained liquid crystal droplets being surrounded by the resin.

For driving the circuit of the present Example, a method as described in the previous invention of the present inventors, as disclosed in Japanese patent application No. 3-163871, may be employed. The liquid crystal panel, thus obtained in the present Example was driven according to substantially the same method disclosed in the aforementioned Japanese patent application No. 3-163871 to confirm the display of images.

EXAMPLE 7

An active matrix addressed liquid crystal cell of an advanced CMOS inverter type using the liquid crystal material described in Example 1 was fabricated. The circuit structure of the matrix fabricated in the present Example is shown in FIG. 4(E). As shown in the figure, it comprises a CMOS inverter in a single pixel and a switching transistor being provided on the scan line connected thereto. That is, the circuit according to the present Example is different from that of Example 6 in that it economizes on scan lines; i.e., the aperture ratio can be increased because one scan line is sufficient for the entire single pixel array.

The first and the second substrates were fabricated essentially in the same process as described in Example 4, except for the circuit arrangement. The first and the second substrates thus obtained were adhered together in the same manner as in Example 1. The same liquid crystal material as that used in Example 1 was injected into the resulting cell structure, and UV light at an intensity of from about 10 to 100 mW/cm$^2$ was irradiated to the liquid crystal material from the first substrate side to cure the resin. Thus was obtained liquid crystal droplets being surrounded by the resin.

For driving the circuit of the present Example, a method as described in the previous invention of the present inventors, as disclosed in Japanese patent application No. 3-169308, may be employed. The liquid crystal panel thus obtained in the present Example was driven according to substantially the same method disclosed in the aforementioned Japanese patent application No. 3-189308 to confirm the display of images.

EXAMPLE 8

An active matrix addressed liquid crystal cell of an advanced CMOS buffer type using the liquid crystal material described in Example 1 was fabricated. The circuit structure of the matrix fabricated in the present Example is shown in FIG. 4(F). As shown in the figure, it comprises a CMOS buffer in a single pixel, and a switching transistor being provided on the scan line connected thereto. That is, the circuit according to the present Example economizes on scan lines; i.e., the aperture ratio can be increased because one scan line is sufficient for the entire single pixel array.

The first and the second substrates were fabricated essentially in the same process as described in Example 4, except for the circuit arrangement. The first and the second substrates thus obtained were adhered together in the same manner as in Example 1. The same liquid crystal material as that used in Example 1 was injected into the resulting cell structure, and UV light at an intensity of from about 10 to 100 mW/cm$^2$ was irradiated to the liquid crystal material from the first substrate side to cure the resin. Thus was obtained liquid crystal droplets being surrounded by the resin.

For driving the circuit of the present Example, a method as described in the previous invention of the present inventors, as disclosed in Japanese patent application No. 3-169307, may be employed. The liquid crystal panel thus obtained in the present Example was driven according to substantially the same method disclosed in the aforementioned Japanese patent application No. 3-169307 to confirm the display of images.

EXAMPLE 9

As shown in FIG. 7, a polymer dispersed liquid crystal was fabricated first by a known process. The present Example refers to a polymer dispersed liquid crystal using a UV curable resin. A transparent conductive coating, i.e., an ITO film 2, was deposited on a light-transmitting substrate 1 by a known vapor deposition or sputtering process to a thickness of from 500 to 2,000Å. The ITO film thus obtained had a sheet resistivity of from 20 to 200 $\Omega/cm^2$. The film thus obtained was patterned by an ordinary photolithographic process. The resulting first and second substrates were adhered together under pressure, while maintaining a spacing of from 5 to 100 µm, preferably from 7 to 30 µm, by incorporating an inorganic spacer between the substrates. In this manner, the cell spacing can be maintained constant at about the diameter of the spacer. As the liquid crystal material, an ester based anti-ferroelectric liquid crystal having a refractive index of 1.6 and a Δn of 0.2 was mixed with a photocurable resin having a refractive index of 1.62 and comprising a mixed system of an urethane oligomer and an acrylic monomer.

The aforementioned mixed material was stirred and subjected to ultrasonic vibration to obtain a homogeneous mixture. The mixing was effected by heating the mixture while applying stirring and ultrasonic vibration to obtain a homogeneous mixture as a liquid of an isotropic phase, and the resulting mixture was cooled to obtain a liquid crystal phase. This method was found very effective for obtaining the desired liquid crystal mixed system.

The resulting liquid crystal mixed system was injected between the first and the second substrates above at a temperature higher than the $S_A$-I phase transition temperature of the liquid crystal mixed system, and an UV light was irradiated thereto at an intensity of from about 10 to 100 mW/cm$^2$ for a duration of from about 30 to 300 seconds to cure the resin while allowing the mixed system to undergo phase separation into a liquid crystal and a resin. As a result, liquid crystal droplets 3 surrounded by a resin 4 were formed.

Figure 11:
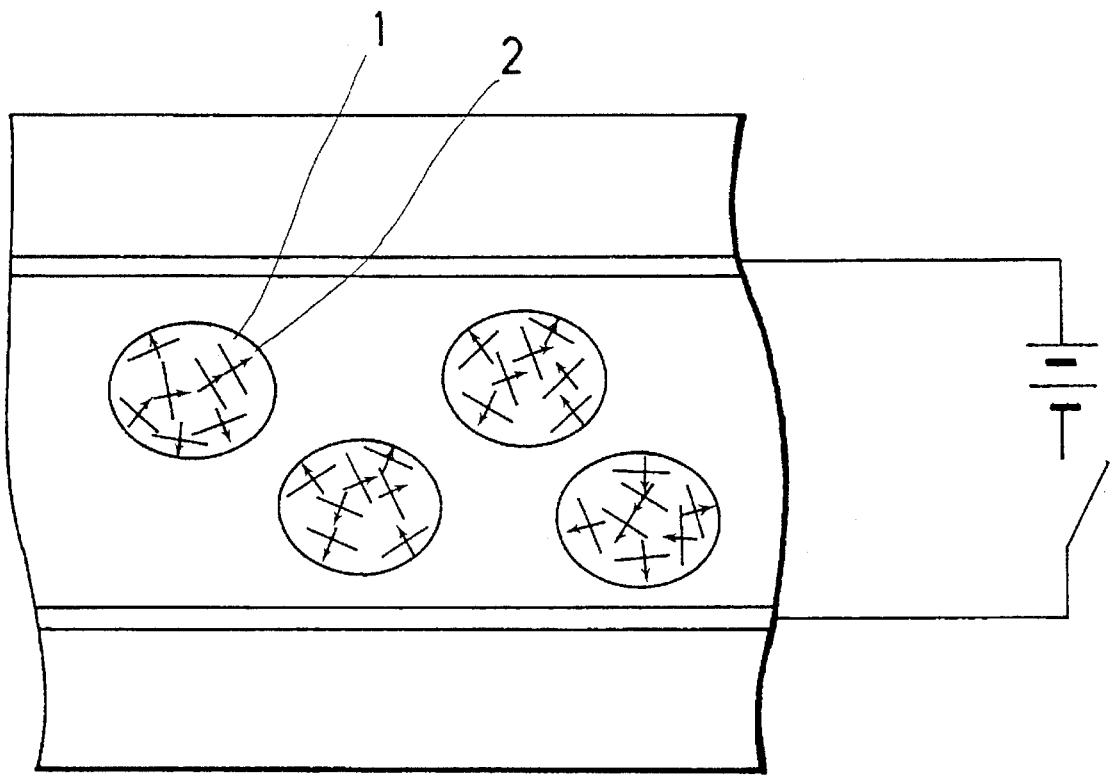
FIG. 11 shows schematically the liquid crystal molecule alignment of a polymer dispersed liquid crystal electro-optical device when no electric field is applied.
Figure 12:
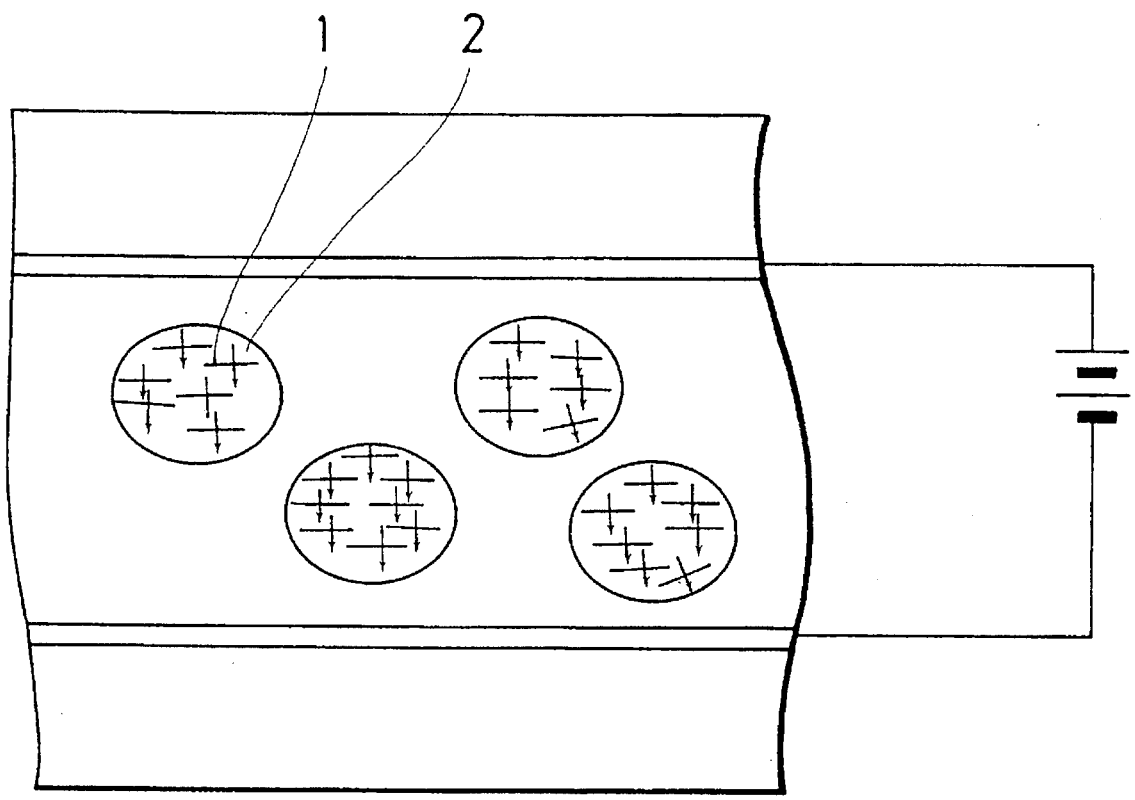
FIG. 12 shows schematically the liquid crystal molecule alignment of a polymer dispersed liquid crystal electro-optical device when an electric field is applied.

The electro-optical modulating layer of the liquid crystal device as shown in FIG. 11 thus obtained transmits a light incident thereon when no electric voltage (no electric signal) is applied to the electro-optical modulating layer between the electrodes having established on the upper and the lower substrates, because the liquid crystal molecules 1 are arranged in a random orientation and the average refractive index of the liquid crystal is almost equal to that of the resin in the random orientation. When a voltage (an electric signal) is applied to the electro-optical modulating layer, on the other hand, the liquid crystal molecules align themselves in such a manner that the major axes thereof be vertical to the direction of the applied electric field owing to the spontaneous polarization 2 of the liquid crystal molecules 1. At this state, a difference in refractive index is generated between the liquid crystal and the polymer resin and the electro-optical modulating layer scatters a light incident thereon.

The liquid crystal material used in the present Example undergoes a phase transition sequence of Iso-SmA-SmC*-SmC$_A$*-Cry. More specifically, it undergoes phase transition from Iso to SmA at 100° C., from SmA to SmC* at 84° C., from SmC* to SmC$_A$* at 82° C., and from SmC$_A$* to Cry at −10.1° C. It has a dielectric anisotropy with a birefringence Δn of about 0.2, and a spontaneous polarization of 80 nC/cm$^2$. The electro-optical characteristics of the liquid crystal electro-optical device comprising the antiferroelectric liquid crystal thus obtained are listed in Table 1.

TABLE 1

| Transmittance | Threshold Voltage | Response Speed |
|---|---|---|
| 95% (0 V) | 9.5 V/μm (when increasing a voltage) | 8.0 μsec. (0->80 V) |
| 56% (80 V) | 5.5 V/μm (when decreasing a voltage) | 306 μsec. (80->0 V) |

Figure 9:
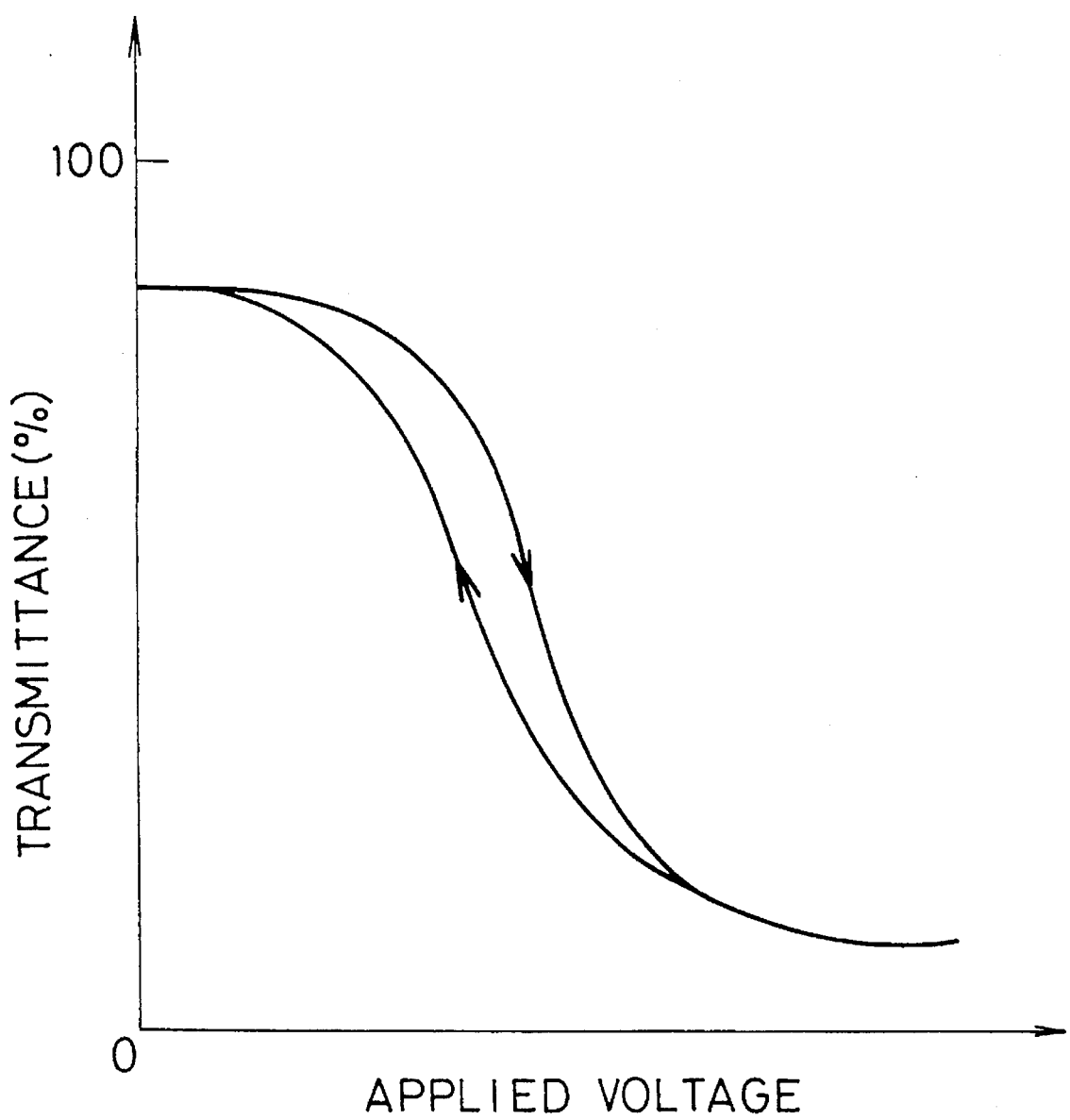
FIG. 9 is a graph showing the change of transmittance with increasing and decreasing voltage of a polymer dispersed liquid crystal electro-optical device in which a liquid crystal material having a negative dielectric anisotropy or a liquid crystal material exhibiting spontaneous polarization along a direction vertical to the major axis of the liquid crystal molecule is used.
Figure 10:
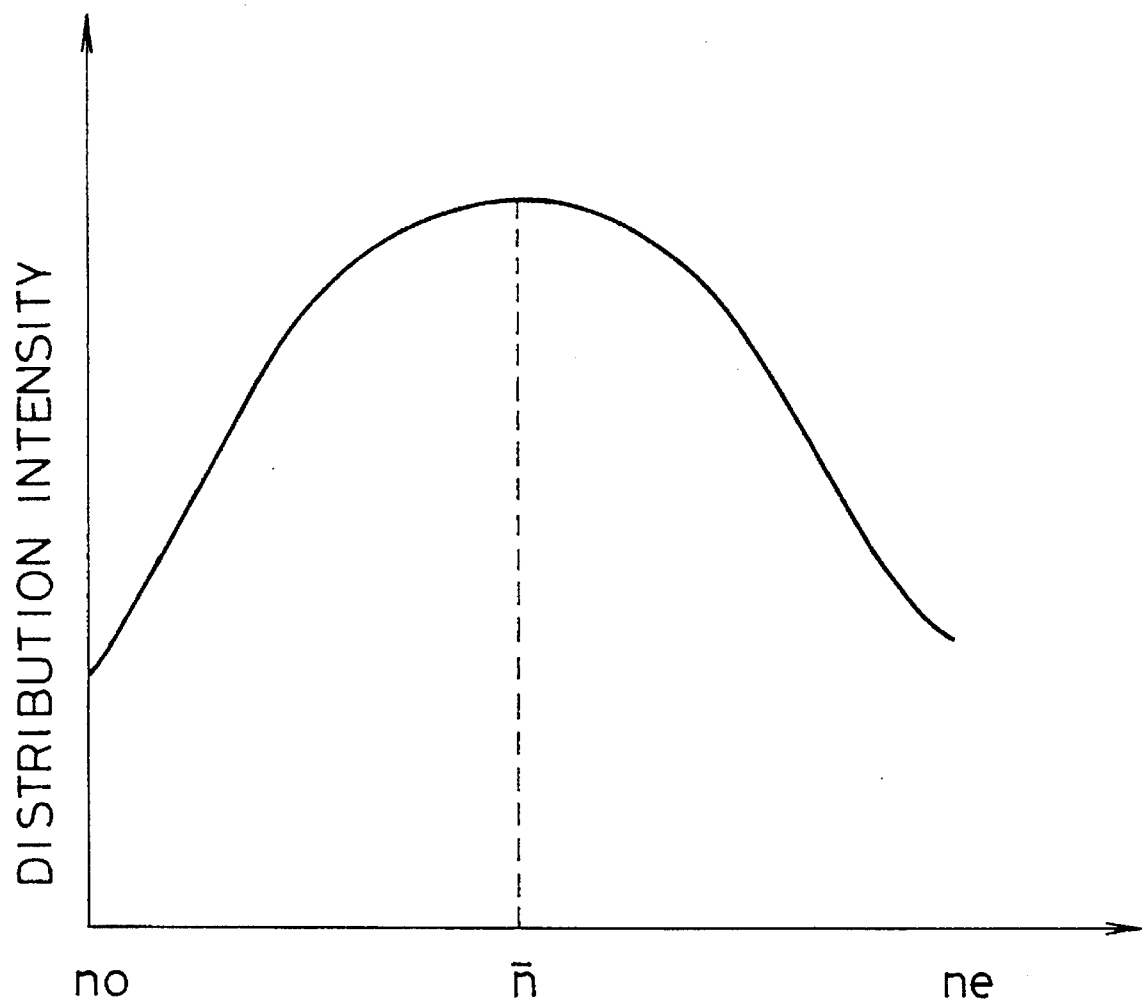
FIG. 10 shows schematically a distribution of refractive indices within a liquid crystal.

The values given in Table 1 are the characteristics at 80° C. As can be clearly read from the transmittance, a PDLC using an anti-ferroelectric liquid crystal material yields a voltage-transmittance relation as shown in FIG. 9. This is in clear contrast to that shown in FIG. 8, which corresponds to a voltage-transmittance curve of a conventional PDLC. The liquid crystal electro-optical device thus obtained yielded a far higher switching rate as compared to that of a device using a conventional nematic liquid crystal material, hence yielding a higher response speed. It required a relative high threshold voltage for driving the liquid crystal as shown in Table 1. However, because the liquid crystal may be replaced by another one having a higher birefringence, i.e., a liquid crystal having a higher light scattering power, the device itself can be made thinner by reducing the spacing between the substrates. Accordingly, the driving voltage can be reduced to a level well comparable to a generally employed voltage.

Because an anti-ferroelectric liquid crystal material is used in the device according to the present invention, the shrinkage of the liquid crystal material due to volume change thereof on applying an electric field for driving the device can be considerably reduced as compared with that of a ferroelectric liquid crystal material. Thus, no vibration occurs on the substrate of the liquid crystal electro-optical device according to the present invention.

Furthermore, a higher contrast can be achieved with a liquid crystal electro-optical device according to the present invention. This is ascribed to the fact that the smectic layer structure, i.e., the structure which the anti-ferroelectric liquid crystal material takes in the dispersed droplets, can be deformed by the electric field being applied thereto. Thus, the refractive index of the liquid crystal material can be greatly differed from that of the transparent substance. This is in clear contrast with the case using a ferroelectric liquid crystal material, because the smectic layer structure of the ferroelectric liquid crystal material as dispersed droplets cannot be deformed by an external electric field.

It should be further added that the liquid crystal material used in the present invention shows a hysteresis in the threshold voltage characteristics because it is based on an anti-ferroelectric liquid crystal material. This is advantageous in realizing an electro-optical device having far improved in response time and a memory function, as compared with the conventional PDLC devices based on a nematic or a ferroelectric liquid crystal.

Figure 1:
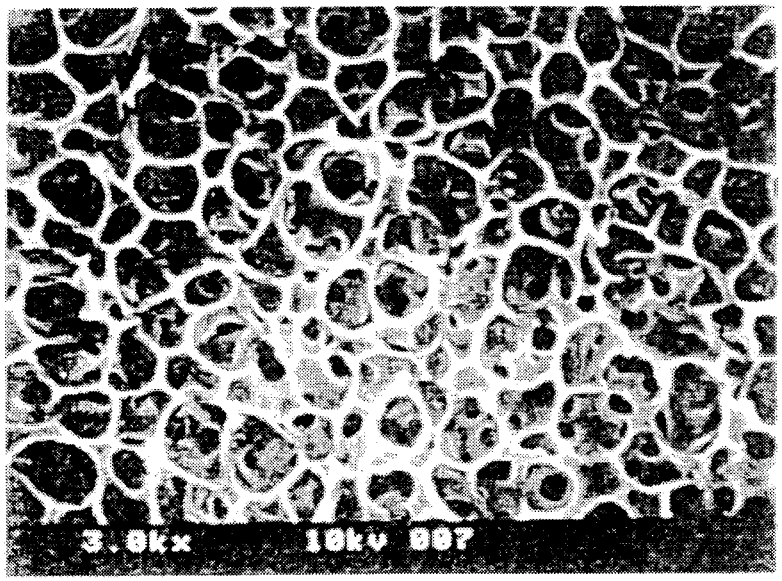
FIG. 1 is an electron micrograph showing the cross section of the light control layer of a liquid crystal electro-optical device according to an embodiment of the present invention.

In the present specification, the dispersed liquid crystal materials were described as droplets, and they were expressed with circles or spherical shapes in the drawings. However, the liquid crystal materials are not restricted to droplets or those having circular shapes, and the same effect as on those above may also be expected on the liquid crystal materials present in other shapes and forms. For example, as shown in the micrograph of FIG. 1, a three-dimensional network, which is the resin observed as a white portion, may be present between the substrates and the liquid crystal may be held in the cavities provided therein.

Furthermore, a dichroic dye and the like may be added to the electro-optical modulating layer to fabricate a liquid crystal electro-optical device of a guest-host type.

In addition, the matrix circuits used in Examples 2, 3, 4, 5, and 8 may be replaced by those shown in FIGS. 5(A), 5(B), 5(C), and 5(D).

Figure 5A:
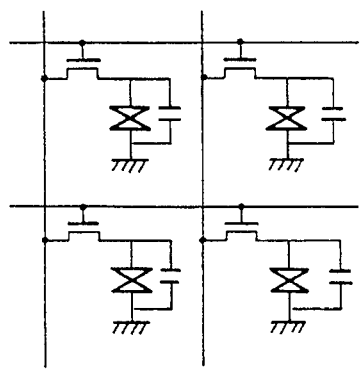
FIGS. 5(A)–5(E) show other circuit diagrams for active matrix addressing and a voltage-tilt angle characteristic curve for an anti-ferroelectric liquid crystal.
Figure 5B:
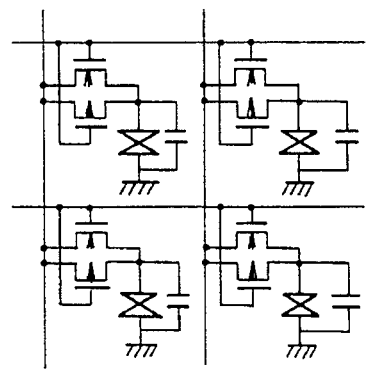
Figure 5C:
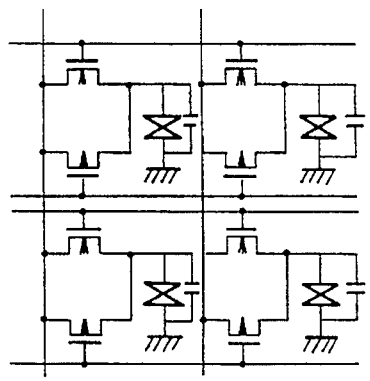
Figure 5D:
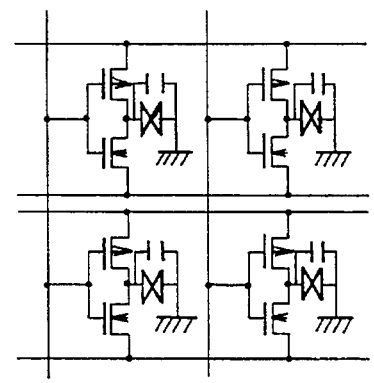
Figure 5E:
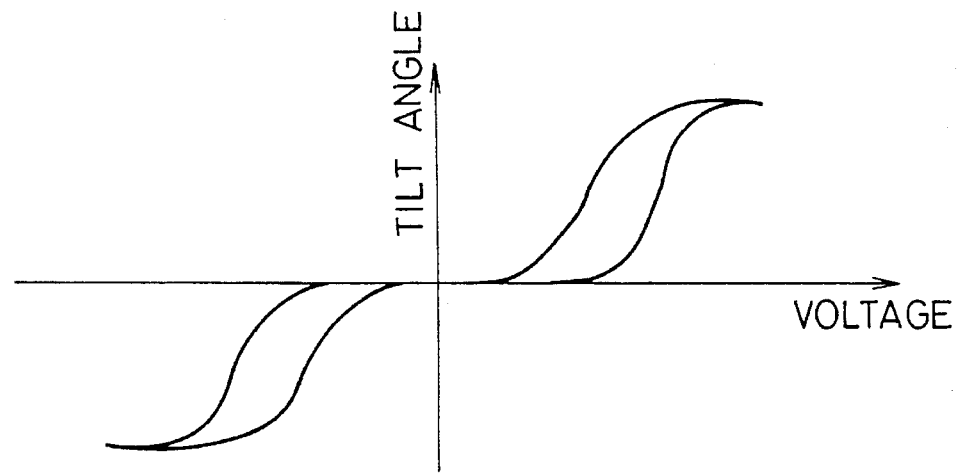

In FIG. 5(E) is shown the tilt angle of the anti-ferroelectric liquid crystal molecules on applying a voltage to the anti-ferroelectric liquid crystal material according to the present invention. It can be seen that the anti-ferroelectric liquid crystal molecules can be stabilized at a larger tilt angle by applying thereto a voltage being stabilized at a value higher than the threshold voltage. However, a fluctuation in the applied voltage may destabilize the anti-ferroelectric liquid crystal molecules. In the circuits illustrated in FIGS. 5(A), 5(B), 5(C), and 5(D), capacitors are provided to absorb such fluctuations and to thereby stabilize the anti-ferroelectric liquid crystal molecules to assure a stable display on a liquid crystal electro-optical device.

As described in detail in the foregoing, the present invention provides a PDLC electro-optical device having a high scattering efficiency under no applied electric field and favorable light transmitting characteristics under an applied electric field. The present invention also provides another type of a PDLC electro-optical device having favorable light transmitting characteristics under no applied electric field and a high scattering efficiency under an applied electric field.

In the former type of the liquid crystal electro-optical device, a switching speed of 40 μsec or even higher is obtained; i.e., a device having a quick response of 100 or more times as quick as that of a conventional device is obtained even on a cell having an inter electrode spacing (thickness of the electro-optical modulating layer) of from 5 to 10 μm. Furthermore, the use of an anti-ferroelectric liquid crystal as the liquid crystal material results in a favorable dielectric property with a relative dielectric constant of 10 to 100. This enables realization of a higher switching rate even on a device having a low electric field intensity, i.e., on such having a thick liquid crystal cell or such under a low voltage. This is because, if the electric field were to be maintained constant, a higher relative dielectric constant signifies that a higher force can be exerted to the liquid crystal molecules for their aligning.

In the latter type of the liquid crystal electro-optical device, a switching speed of 400 μsec or even higher is obtained; i.e., a device having a quick response of 20 or more times as quick as that of a conventional device is obtained even on a cell having an inter electrode spacing of from 5 to 10 μm. Furthermore, the use of an anti-ferroelectric liquid crystal as the liquid crystal material results in a favorable dielectric property with a spontaneous polarization as large as 80 $nC/cm^2$. This enables realization of a higher switching rate even on a device to which only an electric field of low intensity can be applied, i.e., on such having a thick liquid crystal cell or such under a low voltage. This is because, if the electric field were to be maintained constant, a higher spontaneous polarization signifies that a higher force can be exerted to the liquid crystal molecules for their driving.

The conventional ferroelectric liquid crystal devices comprising polarizer sheets comprised cells as thin as from 1.3 to 2.3 μm in thickness. However, they were not practically feasible because they were too thin and were therefore apt to cause short circuit between the upper and the lower substrate electrodes due to contaminations and the like. This problem could be overcome by increasing the interelectrode spacing to a length of from 2.5 to 10 μm. An electro-optical device having a cell thickness of 5 μm, for example, was substantially free of short circuit, and a switching time of 500 μsec or shorter could be obtained thereon at a little expense of reduced electric field intensity. In particular, a switching time of 100 μsec or even shorter was obtained on an electro-optical device of the former type referred hereinbefore.

It should be noted, moreover, that conventional PDLC electro-optical devices based on nematic liquid crystals had no hysteresis in the threshold voltage characteristics and hence no memory function of the display. In the liquid crystal electro-optical device according to the present invention, the use of an anti-ferroelectric liquid crystal material yields a threshold voltage of 9.5 V/μm on applying an electric field to effect the transition from a light-transmitting state to a scattering state. On cutting off the electric field to effect the transition from a light-scattering state to a light-transmitting state, the threshold voltage is, however, 5.5 V/μm. This clear hysteresis can be taken the best for use as a memory.

Furthermore, a bright liquid crystal display which suffers less optical loss was realized by using no polarizer sheets. That is, a liquid crystal panel having a paper-like appearance with a milky white background was obtained. In particular, an image of high contrast can be realized by combining the liquid crystal material of the present invention with an active matrix. Accordingly, a display having an appearance similar to that of a printed matter was realized.

While the invention has been described in detail and with reference to specific examples thereof, it will be apparent to one skilled in the art that various changes and modifications can be made therein without departing from the spirit and scope thereof.

What is claimed is:

1. An electro-optical device comprising:

a pair of substrates at least one of which is transparent;

an electro-optical modulating layer provided between said substrates and comprising an antiferroelectric liquid crystal and a transparent material;

an electrode arrangement provided on said substrates and defining a plurality of pixels in said electro-optical modulating layer; and a plurality of thin film transistors provided on one of said substrates for driving said pixels wherein said electro-optical modulating layer is a polymer dispersed liquid crystal layer.

2. The device of claim 1 wherein said antiferroelectric liquid crystal is surrounded by said transparent material.

3. The device of claim 2 wherein said transparent material comprises a resin.

4. The device of claim 1 wherein thickness of said electro-optical modulating layer is 5 to 10 μm.

5. An electro-optical device comprising:

a pair of substrates at least one of which is transparent;

an electro-optical modulating layer provided between said substrates and comprising an antiferroelectric smectic liquid crystal and a transparent material; and means for applying an electric field to said antiferroelectric liquid crystal wherein said electro-optical modulating layer is a polymer dispersed liquid crystal layer.

6. The device of claim 5 wherein said transparent material comprises a resin.

7. The device of claim 5 wherein thickness of said electro-optical modulating layer is 5 to 10 μ.

8. The device of claim 5 wherein said antiferroelectric smectic liquid crystal is surrounded by said transparent material.

9. The device of claim 5 wherein said means comprises an active matrix circuit.

10. The device of claim 9 wherein said active matrix circuit comprises at least two transistors having different conductivity types from each other for each pixel of said electro-optical device.

11. The device of claim 5 wherein said means comprises an N-channel type transistor and a P-channel type transistor for each pixel of said electro-optical device.

12. An electro-optical device comprising:

a pair of substrates at least one of which is transparent;

an electro-optical modulating layer provided between said substrates and comprising an antiferroelectric smectic liquid crystal and a transparent material; and means for applying an electric field to said antiferroelectric smectic liquid crystal, wherein said electro-optical modulating layer transmits a light incident thereon when no electric signal is applied to said electro-optical modulating layer, and said electro-optical modulating layer scatters a light incident thereon when an electric signal is applied to said electro-optical modulating layer.

13. The device of claim 12 wherein said transparent material comprises a resin.

14. The device of claim 12 wherein said antiferroelectric smectic liquid crystal is surrounded by said transparent material.

15. The device of claim 12 wherein thickness of said electro-optical modulating layer is 5 to 10 μm.

16. An electro-optical device comprising:

a pair of substrates at least one of which is transparent;

an electro-optical modulating layer provided between the substrates and comprising an antiferrolectric liquid crystal and a transparent material; and an electrode arrangement provided on the substrates and defining a plurality of pixels in the electro-optical modulating layer, wherein the electro-optical modulating layer is a polymer dispersed liquid crystal layer.

* * * * *